(No Model.)
T. A. EDISON.
PRESERVING FRUIT.
No. 248,431. Patented Oct. 18, 1881.
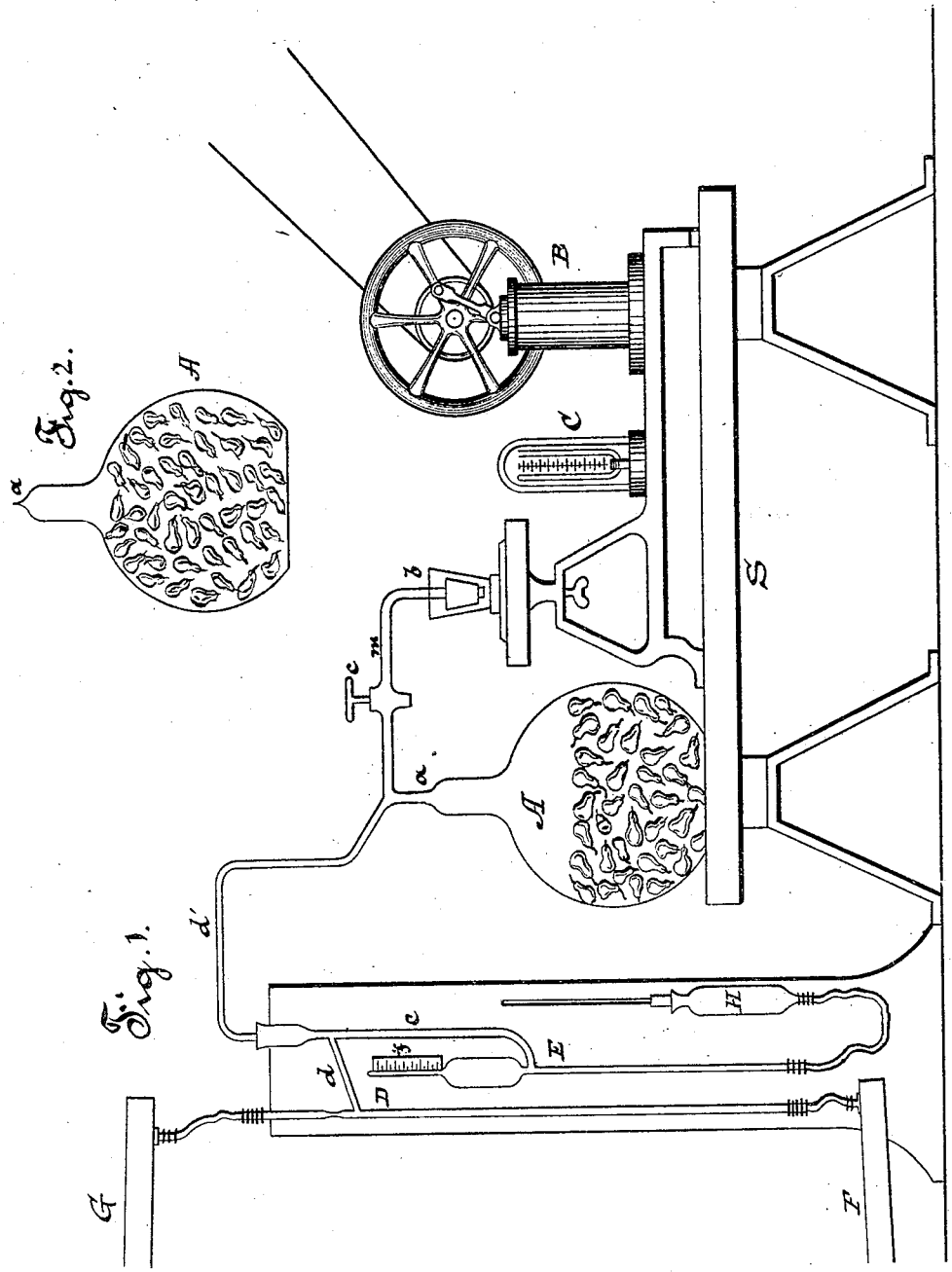
Attest:
D. D. Mott
F. W. Howard
Inventor:
Thos. A. Edison
per Dyer & Wilber
Attys.

UNITED STATES PATENT OFFICE.

THOMAS A. EDISON, OF MENLO PARK, NEW JERSEY.

PRESERVING FRUIT.

SPECIFICATION forming part of Letters Patent No. 248,431, dated October 18, 1881.

Application filed December 14, 1880. (No model.)

*To all whom it may concern:*

Be it known that I, THOMAS A. EDISON, of Menlo Park, in the county of Middlesex and State of New Jersey, have invented a new and useful Improvement in Preserving Fruit; and I do hereby declare that the following is a full and exact description of the same, reference being had to the accompanying drawings, and to the letters of reference marked thereon.

The object I have in view is to produce an economical method of putting up fruits, vegetables, and other organic substances in their natural condition without cooking, for preservation in high vacuo, which method will insure the maintenance of such high vacuo, and consequently the preservation of the articles; and the articles will be surrounded by an envelope which cannot affect them injuriously. This I accomplish by placing the articles to be preserved, or one of them, in a properly-constructed glass vessel, which is shaped up and connected with a glass tube leading to or connected with apparatus for producing in the vessel a high degree of exhaustion; or the opening of the vessel through which the articles are placed therein may be closed by fusion, and the glass exhaust-tube attached at any other suitable point. When the desired high vacuum is obtained the glass tube is "sealed off"—that is to say, the tube is fused by the flame of a blow-pipe—at a point near the vessel, and the vessel is drawn away from the tube at the point of fusion, the result being to hermetically close the vessel and at the same time disconnect it from the glass tube. The articles are then inclosed in an envelope which is essentially a homogeneous piece of glass, and which will maintain for any length of time the high vacuum. The envelope being entirely of glass, the articles cannot be affected injuriously thereby.

My invention consists, first, in the peculiar method of putting up organic substances for preservation and transportation; and, second, in the complete vessel as a new article of manufacture, having the articles sealed in high vacuum therein by the fusion of the glass, the articles being surrounded by an envelope composed essentially of one piece of glass.

In the drawings, Figure 1 is an elevation of the apparatus employed by me for producing high vacuo, a vessel being shown as connected therewith; and Fig. 2, a view of the complete vessel.

A is the vessel, made of glass and filled, or partly filled, with the fruit, vegetables, or other organic substances to be preserved; or it may be made of proper size for holding a single article. The glass vessel is shaped up and joined with a glass tube, $a$, connected with the air-exhausting apparatus. This junction may be formed in several ways. The neck of the vessel may be fused to the glass tube, as shown in Fig. 1; or the neck of the vessel can be formed with a socket, into which a stopple on the tube $a$ can be forced and the joint made tight by a mercury seal above the stopple; or this arrangement can be reversed and the mercury seal dispensed with. The glass tube $a$ is a branch from or is connected with a pipe, $d'$ $m$, the portion $m$ of which is connected with an air-pump, B, by means of a joint, $b$. This joint $b$ is of the usual construction of joints in apparatus of similar character to this, and is composed of a stopple on the tube $m$, setting into a cup. A mercury seal may be used above the stopple.

The branch $m$ is provided with cock $c$, for cutting off or turning on the connection between the pump and vessel A, and a gage, C, may be provided to indicate the degree of exhaustion produced by the pump.

The branch $d'$ is connected with a mercury drop or Sprengel pump, of ordinary construction. This is shown as composed of the mercury-trough G, the receiver F, from which the mercury is raised to G, drop-tube D, tube $e$, branch $d$, tube E H, and gage $f$.

The air-pump is used as an auxiliary to commence the exhaustion, in order to save time; but if the vessel A is of small capacity and nearly filled with some substance, the mercury-drop can alone be used. The vessel A, containing the articles or article, being connected with glass tube $a$—as for example, by fusing the tube to the neck of said vessel—the cock $c$ is opened and a partial vacuum produced by the air-pump. The cock $c$ is then closed and the exhaustion continued by means of the Sprengel pump. When the desired high vacuum has been reached the connection with the air-pump, preferably at the juncture of the tube *a* and neck of vessel A, is fused by a blowpipe, and the vessel A is gradually drawn away from the tube *a*, the separation taking place at the point of fusion, and the vessel being twisted or turned around so as to hermetically close the neck of the vessel. The seal can then be made more perfect, if desired, by the further fusion and working the glass, the complete vessel having the appearance shown in Fig. 2. Another vessel A is then connected with tube *a*—for example, by the fusion of the glass tube to the neck of the vessel—and the operation just explained is repeated.

What I claim is—

1. The method of putting up organic substances for preservation and transportation, consisting in placing them in a glass vessel, producing a high vacuum therein, and then hermetically closing the vessel by sealing off the channel to the air-pump, the envelope produced being essentially a homogeneous piece of glass.

2. As a new article of manufacture, a highly-exhausted glass vessel containing an organic substance sealed therein by the fusion of the glass, the enveloping-vessel being essentially a homogeneous piece of glass, substantially as set forth.

This specification signed and witnessed this 11th day of December, 1880.

THOS. A. EDISON.

Witnesses:
H. W. SEELY,
WM. CARMAN.